US010162643B2

(12) United States Patent
Hati et al.

(10) Patent No.: US 10,162,643 B2
(45) Date of Patent: Dec. 25, 2018

(54) METHOD AND SYSTEM FOR BOOTING AUTOMOTIVE ELECTRONICS IN AN ELECTRONIC CONTROL UNIT OF AN AUTOMOBILE

(71) Applicant: Wipro Limited, Bangalore (IN)

(72) Inventors: Amitesh Hati, Serampore (IN); Monisha Rout, Kolkata (IN)

(73) Assignee: Wipro Limited, Bangalore (IN)

(*) Notice: Subject to any disclaimer, the term of this patent is extended or adjusted under 35 U.S.C. 154(b) by 159 days.

(21) Appl. No.: 15/242,840

(22) Filed: Aug. 22, 2016

(65) Prior Publication Data
US 2018/0004535 A1    Jan. 4, 2018

(30) Foreign Application Priority Data
Jun. 29, 2016 (IN) .............................. 201641022337

(51) Int. Cl.
*G06F 9/4401* (2018.01)

(52) U.S. Cl.
CPC .................................. *G06F 9/4401* (2013.01)

(58) Field of Classification Search
None
See application file for complete search history.

(56) References Cited

U.S. PATENT DOCUMENTS

| 6,212,632 B1* | 4/2001 | Surine ................... G06F 9/4401 348/231.3 |
| 7,103,646 B1 | 9/2006 | Suzuki |
| 8,321,065 B2 | 11/2012 | Kirchhof-Falter et al. |
| 2003/0176951 A1* | 9/2003 | DeMarchi ........... H01M 8/0612 700/286 |
| 2004/0172633 A1* | 9/2004 | Pizzi ....................... G06F 9/461 718/104 |
| 2006/0050735 A1* | 3/2006 | Isaac .................. H04Q 3/54516 370/469 |

(Continued)

FOREIGN PATENT DOCUMENTS

| CN | 102801551 | 11/2012 |
| CN | 103036704 | 4/2013 |

*Primary Examiner* — Kim Huynh
*Assistant Examiner* — Danny Chan
(74) *Attorney, Agent, or Firm* — Finnegan, Henderson, Farabow, Garrett & Dunner L.L.P.

(57) ABSTRACT

Disclosed is a method and system for achieving faster booting of automotive electronics in ECU of an automobile in terms of early availability of vehicle communication. The method comprises implementing an Open Systems and their interfaces for Electronics in motor vehicles (OSEK) based Controller Area Network (CAN) stack in each of booting phases of the ECU, wherein the CAN stack is stored in a memory mapped region of the ECU. The method comprises creating a data structure storing information pertaining to at least runtime information, state information, message buffers, and diagnostic session state, wherein the data structure is stored in the memory mapped region. The information stored in the data structure is used for executing one or more instructions of the OSEK based CAN stack for booting the automotive electronics in the ECU, wherein the one or more instructions are executed across each of the booting phases of the ECU.

14 Claims, 6 Drawing Sheets

(56) References Cited

U.S. PATENT DOCUMENTS

| | | | |
|---|---|---|---|
| 2006/0277400 A1* | 12/2006 | Veen | G06F 9/4401 713/1 |
| 2010/0079472 A1* | 4/2010 | Shang | G06F 9/4401 345/545 |
| 2014/0368653 A1* | 12/2014 | Wang | G06F 13/24 348/148 |
| 2017/0015246 A1* | 1/2017 | Honghalli Devaraju | G06F 9/4401 |

* cited by examiner

METHOD AND SYSTEM FOR BOOTING AUTOMOTIVE ELECTRONICS IN AN ELECTRONIC CONTROL UNIT OF AN AUTOMOBILE

TECHNICAL FIELD

The present subject matter is related, in general to automobiles, and more particularly, but not exclusively to a method and system for booting automotive electronics in an Electronic Control Unit (ECU) of the automobile.

BACKGROUND

Automotive electronics are electrically-generated systems that are used in automobiles. The first automotive electronic pieces were used to control engine functions of the automobiles and were referred to as Electronic Control Units (ECUs). The number of ECUs being used in an automobile has increased as the automotive electronic controls began to be used for more automotive applications. Some applications of using ECUs in automobiles include transmission control, chassis control, active safety, driver assistance, infotainment systems and passenger comfort. In fact, many automobile buyers today care more about the automotive electronics embedded in the automobile than actual functioning of the automobile.

On the other hand, the automotive electronics of the automobiles demand one of the highest real time deadlines, as the engine itself is a very fast and complex part of the automobile. Originally the automotive electronics systems were simple embedded systems. But in recent years, the complexity of those systems has increased which led to use of complex system with high level operating systems (QNX, Linux, Win CE etc.). But, due to the added complexity the booting process of the automotive electronics system is slower at times. This in turn delays the critical functional process related to the automotive electronics in the automobile.

The existing automobile assemblies make use of a standard vehicle bus, called a Controller Area Network (CAN) bus, to allow various ECUs and hardware components in the automobile to communicate with each other during use of the various automotive electronics. However, due to delay in the booting process, the CAN based applications start functioning long after the CAN bus starts functioning. This delay in the booting process causes a delay in communication, within the CAN bus. Typically, a CAN bus availability expectation is 100 milliseconds to 300 milliseconds. Whereas a high level OS takes few seconds to boot-up and make the CAN network available. Hence, there is a need for a method and system that reduces the time taken to make the CAN bus available well before the ECU operating system finishes boot-up.

The challenges mainly faced in booting the automotive electronics in the automobile include achieving a simultaneous initiation of the operating system and the applications of the ECU during booting of the automotive electronics in the ECU of the automobile.

SUMMARY

Disclosed herein are a method and a system for booting automotive electronics in an Electronic Control Unit (ECU) of an automobile. Each phases of the booting process in the automobile utilizes an executable image stored in a memory mapped region of the ECU in the automobile. The information stored in the memory mapped region of the ECU are used for booting the automotive electronics in the ECU, thereby speeding up the process of booting across each booting phases.

Accordingly, the present disclosure relates to a method for booting the automotive electronics in the ECU of the automobile. The method comprises implementing, by an electronic system, an Open Systems and their interfaces for the Electronics in motor vehicles (OSEK) based Controller Area Network (CAN) stack in each of the booting phases of the ECU, wherein the OSEK based CAN stack is stored in a memory mapped region of the ECU. The method further comprises creating a data structure that stores information pertaining to at least runtime information, state information, message buffers, and diagnostic session state, wherein the data structure is stored in the memory mapped region of the ECU. Upon creating the data structure, the information stored in the data structure is used for executing one or more instructions of the OSEK based CAN stack for booting the automotive electronics in the ECU, wherein the one or more instructions are executed across each of the booting phases of the ECU, thereby completing the booting of the automotive electronics in the ECU.

Further, the present disclosure relates to an electronic system for booting automotive electronics in an Electronic Control Unit (ECU) of an automobile. The electronic system comprises a processor and a memory communicatively coupled to the processor, wherein the memory stores processor-executable instructions, which, on execution, causes the processor to perform one or more functions of the electronic system. Initially, the electronic system implements an Open Systems and their interfaces for the Electronics in motor vehicles (OSEK) based Controller Area Network (CAN) stack in each of the booting phases of the ECU, wherein the OSEK based CAN stack is stored in a memory mapped region of the ECU. Further, the electronic system creates a data structure that stores information pertaining to at least runtime information, state information, message buffers, and diagnostic session state, wherein the data structure is stored in the memory mapped region of the ECU. Finally, the electronic system executes one or more instructions of the OSEK based CAN stack as a part of the booting process of the automotive electronics in the ECU based on the information stored in the data structure, wherein the one or more instructions are executed across each of the booting phases of the ECU, thereby completing the booting of the automotive electronics in the ECU.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and system for booting automotive electronics in an Electronic Control Unit (ECU) of the automobile. The disclosure proposes a solution for enhancing the speed of booting in the automobile. The disclosure relates to a method of one time initializing of an Open Systems and their interfaces for the Electronics in motor vehicles (OSEK) based Controller Area Network (CAN) stack before the Operating System (OS) within the ECU of the automobile starts to execute and continuing the CAN stack execution through the OS initialization and execution phases. The one-time initialization of the OSEK based CAN stack enhances the booting up process at the OS level as well as at the application level since the OS references a memory mapped region from the hardware level to its own application process and continues to execute one or more actions, thus reducing the time required for performing the initialization. Further, the present disclosure discloses the method of making the OSEK based CAN stack available before the OS for achieving a faster CAN network availability. As the CAN network stack is always in one place of the flash memory, duplication of the CAN network stack code is also avoided. The CAN network stack and the associated applications will then run in a low footprint OSEK supported OS, and this will be running as a process once the main high level OS completes booting up, thereby making the booting process and initiation of the OS simultaneously.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1A:
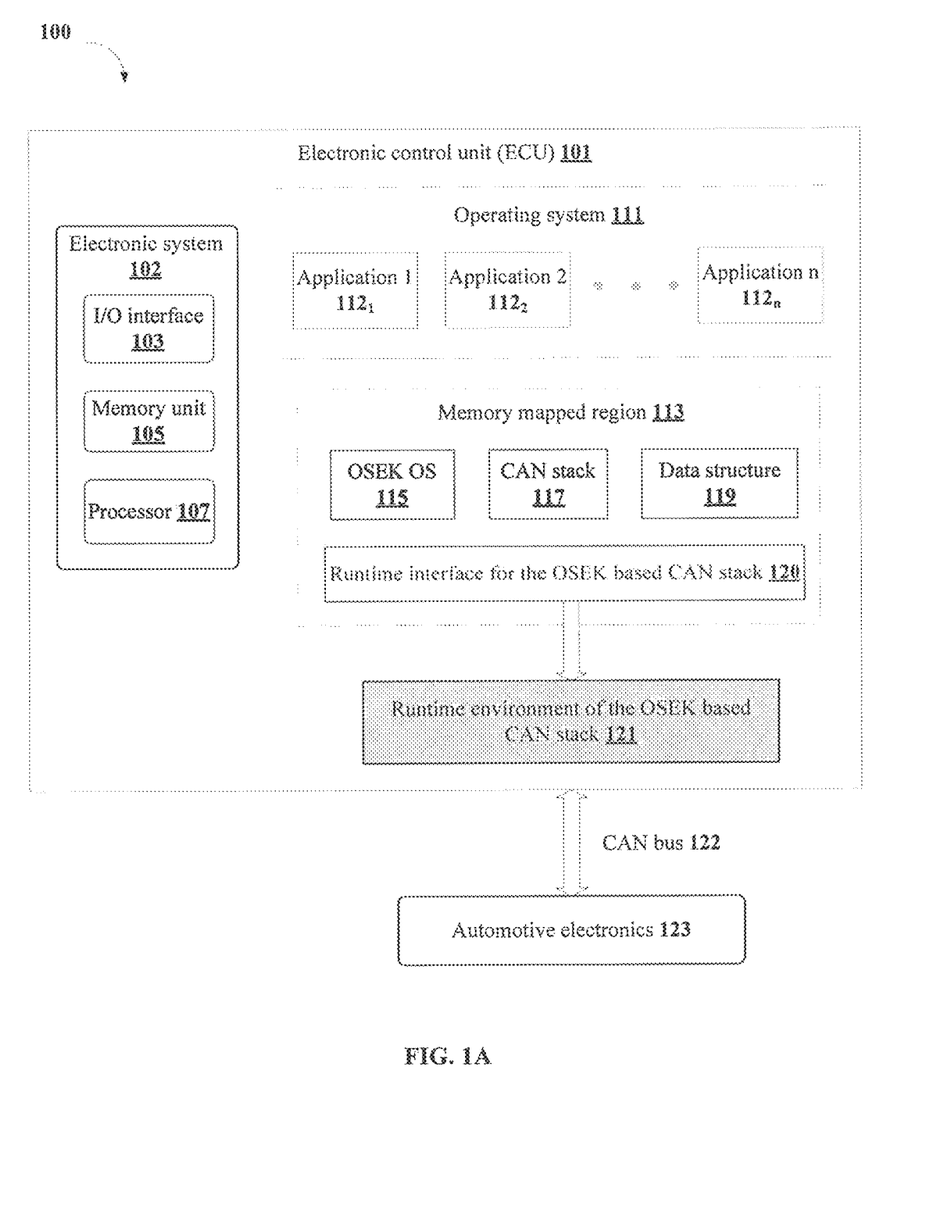
FIG. 1A shows an exemplary environment illustrating a method for booting automotive electronics in the ECU of the automobile in accordance with some embodiments of the present disclosure.

FIG. 1A shows an exemplary environment illustrating a method for booting automotive electronics in the ECU of the automobile in accordance with some embodiments of the present disclosure.

The ECU 101 of the automobile is responsible for controlling one or more electrical systems or subsystems that are embedded in the automobile. One of the key elements of the ECU 101 is an operating system 111, such as QNX Real Time Operating System (RTOS) that manages and executes one or more applications, application 1 $112_1$ to application n $112_n$ (collectively referred as applications 112) of the ECUs 101. The one or more applications of the ECU 101 that are executed through the operating system 111 of the ECU 101 may include, without limitation, an engine control application, a speed control application, a transmission control application, a battery management application and an application for managing human-machine interfaces.

In an embodiment, similar to any computerized system, the ECU 101 in the automobile has to be booted before the one or more electrical systems and subsystems in the automobile can be used. The booting of the ECU 101 may be distributed into one or more booting phases 201, namely a boot loader phase 201a, a pre-boot phase 201b and a post booting phase 201c. However, in a general scenario, the operating system 111 and the one or more applications 112 of the ECU 101 may be executed only after the booting process is complete, i.e. after the pre-boot phase 201b. Hence, there may be a delay in initialization of the automotive electronics 123 in the automobile, since the one or more applications required for initializing (including CAN stack 117 and dependent applications) and/or booting these automotive electronics 123 may not be ready for execution in the ECU 101 until the booting process is complete. The present disclosure eliminates the delay in CAN network communication ability of the automotive electronics 123 in the ECU 101 by introducing an early executable OSEK based CAN stack 117 (also referred as CAN stack 117) in the memory mapped region 113 of the ECU 101. The electronic system 102 executes one or more instructions stored in the memory mapped region 113 to achieve a faster CAN network communication ability of the ECU 101.

In an embodiment, the electronic system 102 may be used in the ECU 101 of the automobile for initializing the operating system 111 and for executing the one or more applications 112 of the ECU 101. The electronic system 102 comprises an I/O interface 103, a memory unit 105 and a processor 107. The I/O interface 103 may be used for exchanging one or more data and/or instruction with the ECU 101 of the automobile. The memory unit 105 of the electronic system 102 may be communicatively coupled to the processor 107 of the electronic system 102. The memory unit 105 stores the one or more data and/or processor-executable instructions to be executed by the processor 107. The processor 107 executes the one or more instructions stored in the memory unit 105, thereby performing one or more operations required for faster booting of the automotive electronics 123 in the ECU 101.

In an embodiment, the electronic system 102 may be configured to implement the CAN stack 117, stored in the memory mapped region 113, in each of the booting phases 201 of the ECU 101 for providing a runtime environment of the OSEK based CAN stack 121 for execution in each of the booting phases 201 of the ECU 101. OSEK is a low footprint operating system which can run the CAN stack 117 and provide standard software architecture for various operations of the ECU 101 and specifies standard runtime interfaces used by the ECU 101 in the automobile.

The CAN Stack 117 manages communication of the one or more applications 112 with the automotive electronics 123 in the ECU 101 using a CAN bus 122 allotted in the ECU 101. The CAN bus 122 is a message-based protocol, that is designed for transferring data between ECUs on same and different networks in the automobile via a gateway connected to two or more ECUs. The CAN stack 117 allows the ECU 101 and the automotive electronics 123 to communicate with each other during the execution of the one or more applications 112 in the ECU 101 via CAN bus 122. As an example, the CAN bus 122 may be used for providing a network connection between the chassis and the power train ECUs 101 of the automobile for engine management and transmission control. Typically, the CAN stack 117 may also be used as a network for connecting body and comfort electronics of the automobile. Here, the CAN stack 117 is used as an interface between the one or more applications 112 of the ECU 101 and other ECUs in the CAN bus 122. In an embodiment, OSEK OS 115 and the CAN stack 117 may be placed in a memory mapped region 113 of the ECU 101, as shown in FIG. 1A. The memory mapping address range may change as the ECU 101 progresses through the booting phase. The CAN stack 117 and the one or more associated applications 112 will then run in an OSEK supported OS 115, thereby providing early CAN network capability while the operating system 111 simultaneously boots up during the boot loader phase 201a.

In an embodiment, information related to the runtime environment of the OSEK based CAN stack 121 may store execution time data (such as message buffers) as a data structure 119 in the memory mapped region 113 of the ECU 101. The information stored in the data structure 119 may include, without limitation, runtime information, state information, message buffers, and diagnostic session state of the runtime environment of the OSEK based CAN stack 121. The information stored in the data structure 119 may be used by the ECU 101 for application functionality it is supposed to provide to automotive electronics 123 in the automobile.

Figure 1B:
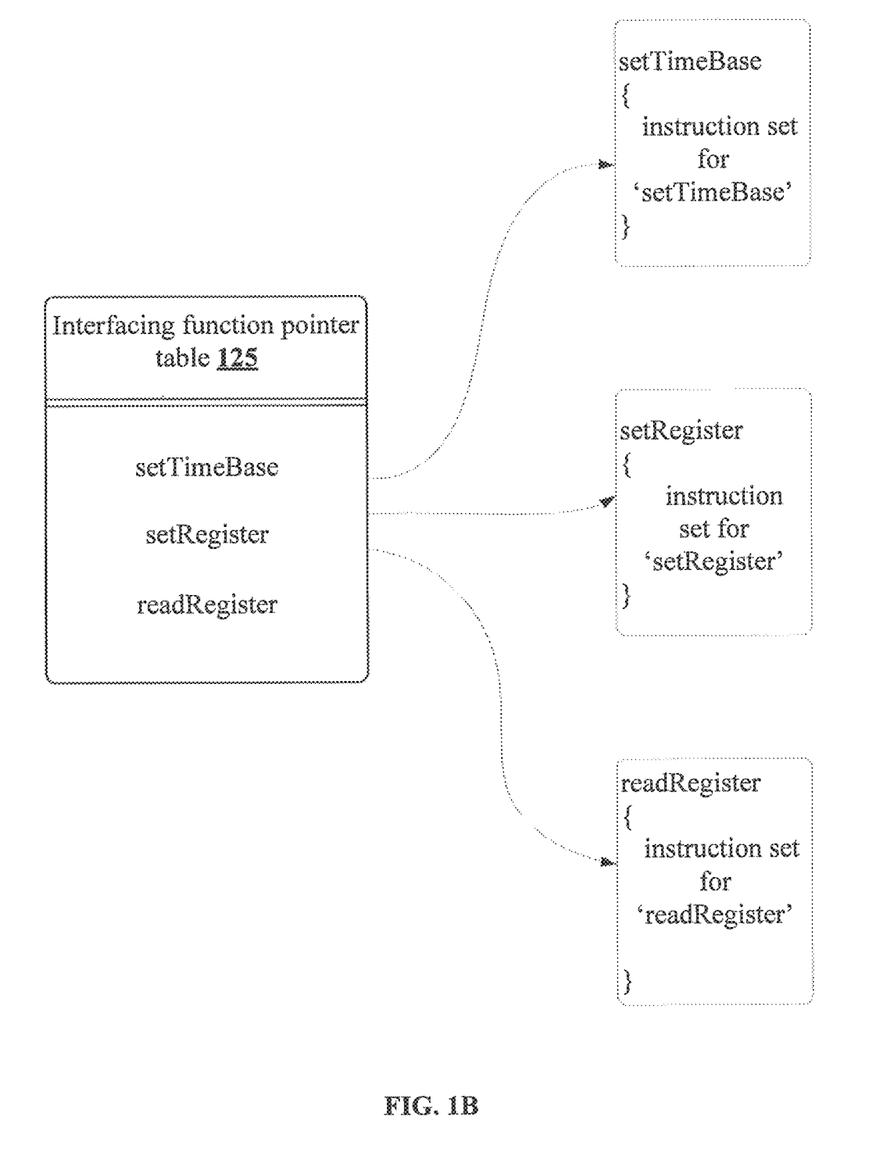
FIG. 1B shows structure of an interfacing function pointer table in accordance with some embodiments of the present disclosure.

An exemplary representation of one or more runtime data that are stored in the data structure 119 are listed herein below.
1. Runtime data for OSEK OS 115:
OSEK_Runtime OsekOS_runtimeData;
2. Runtime data for CAN stack 117 message buffers:
CAN_MSG Message_Buffer[NUMBER_OF_SUPPORTED_MSGs];
3. Runtime data for CAN application:
CAN_SM CAN_ApplicationRuntimeData;
4. Runtime Data for various applications 112 of the ECU 101:
ButtonApplication ButtonRuntimeData;
FuelApplication FulRuntimeData;
SensorApplication SensorRuntimeData;

In an implementation, the information related to the runtime environment of the OSEK based CAN stack 121 may be stored in the form of an interfacing function pointer table 125 within the data structure 119. FIG. 1B shows structure of the interfacing function pointer table 125 in accordance with few embodiments of the present disclosure. The interfacing function pointer table 125 comprises one or more subroutine pointers required for performing one or more operations of the OSEK OS 115 through each of the booting phases 201. In an embodiment, a plurality of interfacing function pointer table 125 may be stored in the data structure 119, wherein each of the plurality of interfacing function pointer tables 125 correspond to different applications 112 performed by the ECU 101. In another embodiment, the interfacing function pointer table 125 may be stored in the memory unit 105 of the electronic system 102.

In an embodiment, the interfacing function pointer table 125 may comprise different subroutine pointers that perform interfacing of the automotive electronics 123 with the ECU 101 (device interfacing). The implementation of the aforementioned subroutine pointers in the interfacing function pointer table 125 differs as it progresses through each of the booting phases 201. Hence, each of the subroutine pointers is implemented in the OSEK runtime of the respective booting phases 201. Another aspect of the subroutine pointers is that, the subroutines pointed by those pointers are inherently stateless in nature. This enables swapping of the subroutines in the runtime environment of the OSEK based CAN stack 121 without carrying any runtime data in the runtime.

As an example, consider an interfacing function pointer table 125 comprising three subroutine pointers, namely 'setTimeBase', 'setRegister' and 'readRegister'. Each of the subroutine pointers stored in the interfacing function pointer table 125 point to a memory location in the ECU 101, wherein the memory location stores one or more instructions corresponding to the calling subroutine pointer. The runtime interface for the OSEK based CAN stack 120 invokes the one or more subroutine pointers in the interfacing function pointer table 125 during implementation of the runtime environment of the OSEK based CAN stack 121 in the ECU 101.

TABLE A

| Subroutine pointers | Memory Address | | |
| --- | --- | --- | --- |
| | Boot loader phase | Pre-boot phase | Post booting phase |
| setTimerBase | 0x400100 | 0x500100 | 0xA00100 |
| setRegister | 0x400200 | 0x500200 | 0xA00200 |
| readRegister | 0x400500 | 0x500500 | 0xB00500 |

Table A shows the subroutines pointers of the interfacing function pointer table 125 and the memory addresses that point to the corresponding subroutines in the memory location within the ECU 101. As indicated in the table, each of the subroutine pointers in the interfacing function pointer table 125 point to a distinct memory location at each of the booting phases 201, since the OSEK runtime for each of the booting phases 201 varies. The memory location of each of the subroutines may be dynamically determined during the runtime of the OSEK runtime, instead of the determining them during the compile time, depending on the nature of the runtime environment of the OSEK based CAN stack 121 and the applications 112 being executed. In an embodiment, the OSEK runtime corresponding to one of the booting phases 201 will store a unique copy of the interfacing function pointer table 125, in contrast to storing the complete interacting function pointer table 123 in a single memory location.

In an embodiment, the interfacing function pointer table 125 of the CAN stack 117 is updated upon completing execution of each of the booting phases 201 based on the information stored in the data structure 119. As an example, the interfacing function pointer table 125 may be updated with one or more Application Program Interfaces (APIs) required for executing the one or more applications 112 of the ECU 101, through the runtime environment of the OSEK based CAN stack 121.

Figure 2A:
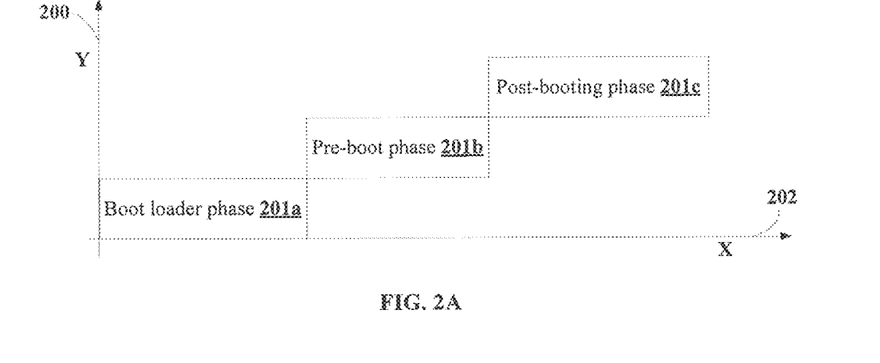
FIGS. 2A and 2B show a timeline of events that takes place when the booting process is initiated in the ECU in accordance with some embodiments of the present disclosure.
Figure 2B:
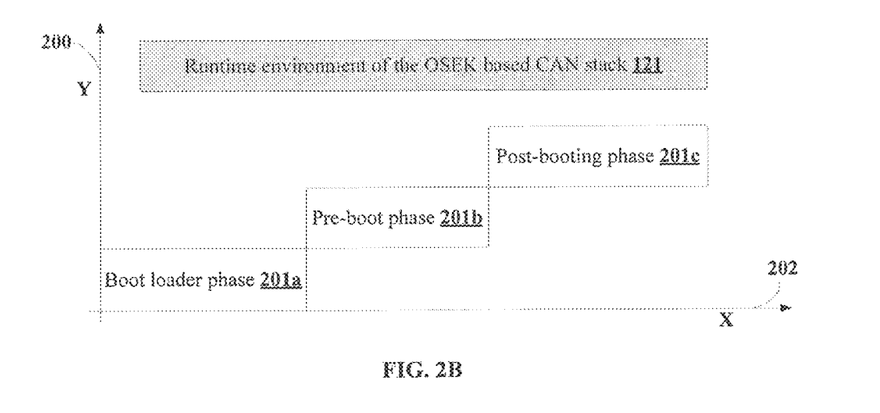

FIGS. 2A and 2B show a timeline of events that takes place when the booting process is initiated in the ECU 101 in accordance with some embodiments of the present disclosure. In one embodiment, X-axis denoted by 202 in FIGS. 2A and 2B may indicate time of execution of each of the booting phases 201. Similarly, Y-axis denoted by 200 in FIGS. 2A and 2B may indicate each of the booting phases 201.

In a general scenario, as shown in FIG. 2A, the initiation of the booting process starts with the initiation of the boot loader phase 201a. During the boot loader phase 201a, a piece of code called the "boot loader" runs before the operating system 111 of the ECU 101 is initialized. In an embodiment, the boot loader may be specific for the operating system 111 being used in the ECU 101 and is used for booting the operating system 111 and the one or more applications 112. The pre-boot phase 201b starts upon completion of the boot loader phase 201a. The pre-boot phase 201b serves as loader phase of the operating system 111 of the ECU 101 from ROM memory. During post booting phase 201c, the operating system 111 of the ECU 101 is initialized and becomes functional along with the one or more applications 112 that it may require to run the automotive electronics 123 in the automobile. Here, it is evident from FIG. 2A, that the operating system 111 and the one or more applications 112 of the ECU 101 are initialized only in the post booting phase 201c of the ECU 101, thus resulting in a delay of service whenever a request for using one of the applications 112 of the ECU 101 is raised in the automobile.

However, as indicated in FIG. 2B, implementing the CAN stack 117 in each of the booting phases 201 of the ECU 101 will eliminate the above mentioned delay by introducing a functional, runtime environment of the OSEK based CAN stack 121 at an early stage in the boot loader phase 201a and continuing to provide the same application environment across each of the other booting phases 201. Here, the operating system 111 and the one or more applications 112 of the ECU 101 are initiated and run at the early stage of the boot loader phase 201a through the runtime environment of the OSEK based CAN stack 121.

Figure 2C:
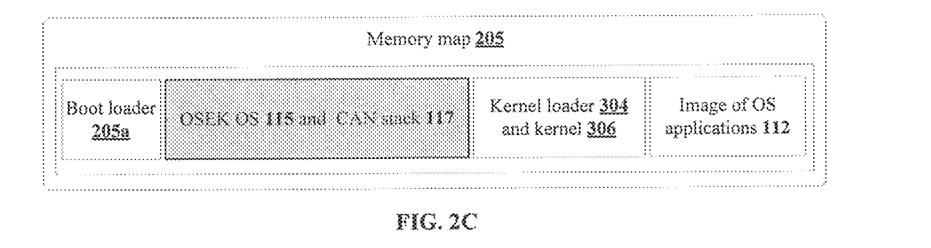
FIG. 2C shows an instance of the memory mapped region of the ECU in accordance with some embodiments of the present disclosure.

FIG. 2C indicates a memory map 205 of the memory mapped region 113 of the ECU 101. During the boot loader phase 201a, the boot loader 205a initializes the CAN stack 117 before the kernel loader 304, kernel 306, the operating system 111 and the one or more applications 112 of the ECU 101 are initialized. Upon completion of pre-boot phase 201b, In an embodiment, a single copy of the runtime environment of the OSEK based CAN stack 121 is kept in the memory mapped region 113 of the ECU 101 and each of the booting phases 201 make use of the same set of functionalities and system interfaces that are provided by the runtime environment of the OSEK based CAN stack 121.

Figure 3:
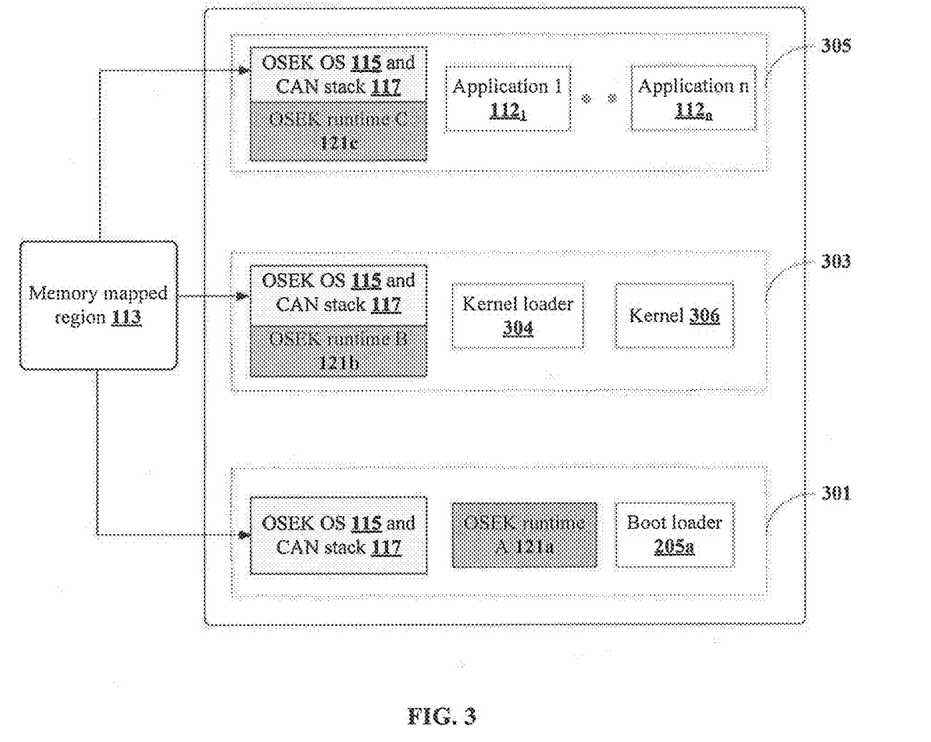
FIG. 3 shows a block diagram illustrating various execution phases of the OSEK based CAN stack in accordance with few embodiments of the present disclosure.

FIG. 3 shows a block diagram illustrating various execution phases of the OSEK based CAN stack in accordance with few embodiments of the present disclosure.

In an embodiment, during each of the booting phases 201, the ECU 101 may run a single runtime environment of the OSEK based CAN stack 121 that can provide various interfaces including, CAN drivers, General-purpose input/output (GPIO) interfaces, analog-to-digital (A/D) drivers, and timers. Since the one or more functionalities of the CAN stack 117 changes at each of the booting phases 201 of the ECU 101, the runtime environment of the OSEK based CAN stack 121 may change corresponding to each of the booting phases 201. However, each of the runtime environments of the OSEK based CAN stack 121 continues to provide exactly the same set of system interfaces across each of the booting phases 201. Here, in FIG. 3, the sequence 301 indicates the boot loader phase 201a of the ECU 101, where an OSEK runtime of type "A" 121a is run to support OSEK OS 115 and CAN stack 117 at the boot loader phase 201a. At sequence 303, an OSEK runtime of type "B" 121b is run to support the OSEK OS 115 and CAN stack 117 while initializing the kernel loader 304 and the kernel 306 of the ECU 101. Similarly, at sequence 305, an OSEK runtime of type "C" 121c is run to support the OSEK OS 115 and CAN stack 117, wherein the OSEK runtime "C" provides a platform for CAN stack 117 to interface with the one or more applications 112 of the ECU 101. Even though the OSEK runtime used at each of the booting phases 201 is different, each of the OSEK runtime continue to provide same set of system interfaces required for execution of each of the booting phases 201 by varying only the way in which functionalities are achieved in each of the OSEK runtime namely, "A" "B" and "C". In an embodiment, instances of each of the OSEK runtime are stored in a flash memory of the respective boot images of the booting phases 201.

Figure 4:
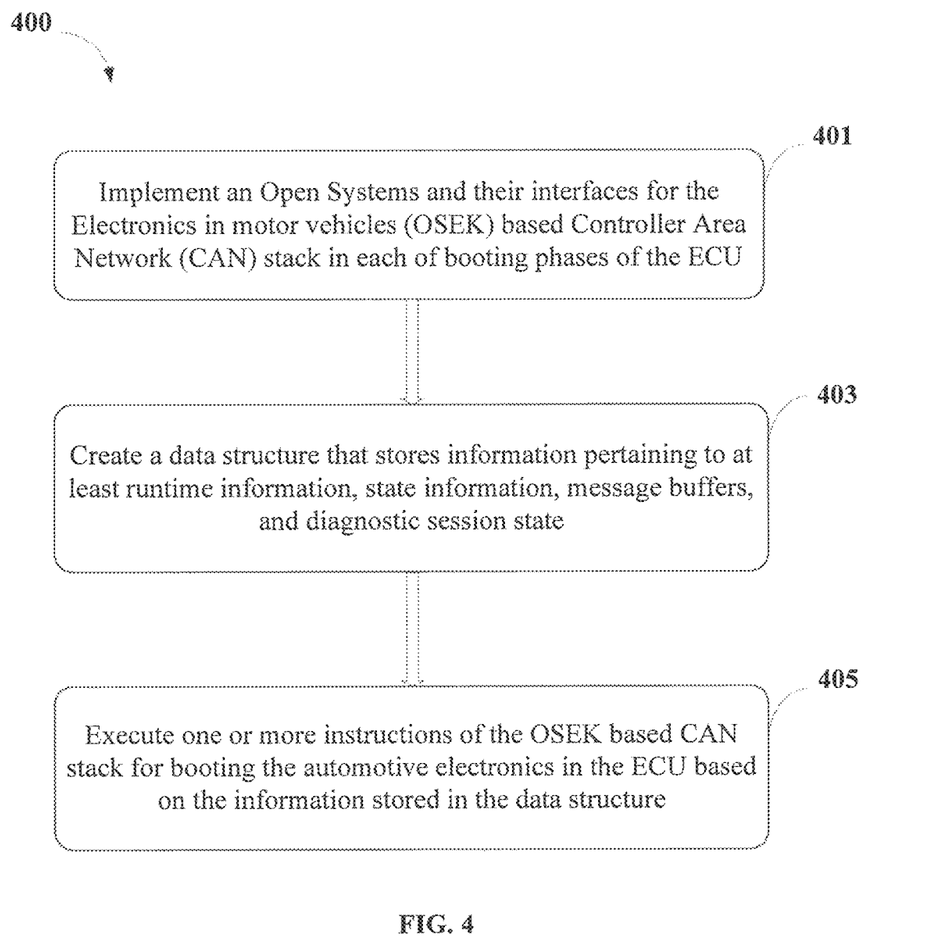
FIG. 4 shows a flowchart illustrating a method for booting the automotive electronics in the ECU of an automobile in accordance with some embodiments of the present disclosure.

FIG. 4 illustrates a flowchart showing method for booting automotive electronics in the ECU 101 of the automobile in accordance with some embodiments of the present disclosure.

As illustrated in FIG. 4, the method 400 comprises one or more blocks for booting the automotive electronics 123 in the ECU 101 of the automobile using an electronic system 102. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, the electronic system 102 implements an Open Systems and their interfaces for the Electronics in motor vehicles (OSEK) based Controller Area Network (CAN) stack in each of booting phases 201 of the ECU 101, wherein the CAN stack 117 is stored in a memory mapped region 113 of the ECU 101. In an embodiment, an OSEK OS 115 is used for executing the CAN stack 117 and one or more applications 112 of the ECU 101. The each of the booting phases 201 comprises a boot loader phase 201a, a pre-boot phase 201b and a post booting phase 201c. In an embodiment, a runtime environment of the OSEK based CAN stack 121 in each of the booting phases 201 provides same set of system interfaces to each of the booting phases 201. However, the runtime environment of the OSEK based CAN stack 121 is implemented separately at each of the booting phases 201.

At block 403, the electronic system 102 creates a data structure 119 that stores information pertaining to at least runtime information, state information, message buffers, and diagnostic session state, wherein the data structure 119 is stored in the memory mapped region 113 of the ECU 101. The electronic system 102 causes the data structure 119 to live through each of the booting phases 201.

At block 405, the electronic system 102 executes one or more instructions of the CAN stack 117 for booting the automotive electronics 123 in the ECU 101 based on the information stored in the data structure 119, wherein the one or more instructions are executed across each of the booting phases 201 of the ECU 101. The one or more instructions of the CAN stack 117 is executed as an application process of the OSEK OS 115 in post booting phase 201c. In an embodiment, the electronic system 102 further comprises updating an interfacing function pointer table 125 of the CAN stack 117 upon completing execution of each of the booting phases 201 based on the information stored in the data structure 119. The interfacing function pointer table 125 comprises one or more subroutine pointers required for performing one or more operations of the OSEK OS 115 through each of the booting phases 201. The interfacing function pointer table 125 is updated with one or more APIs required for performing the one or more operations of the OSEK OS 115.

Computer System

Figure 5:
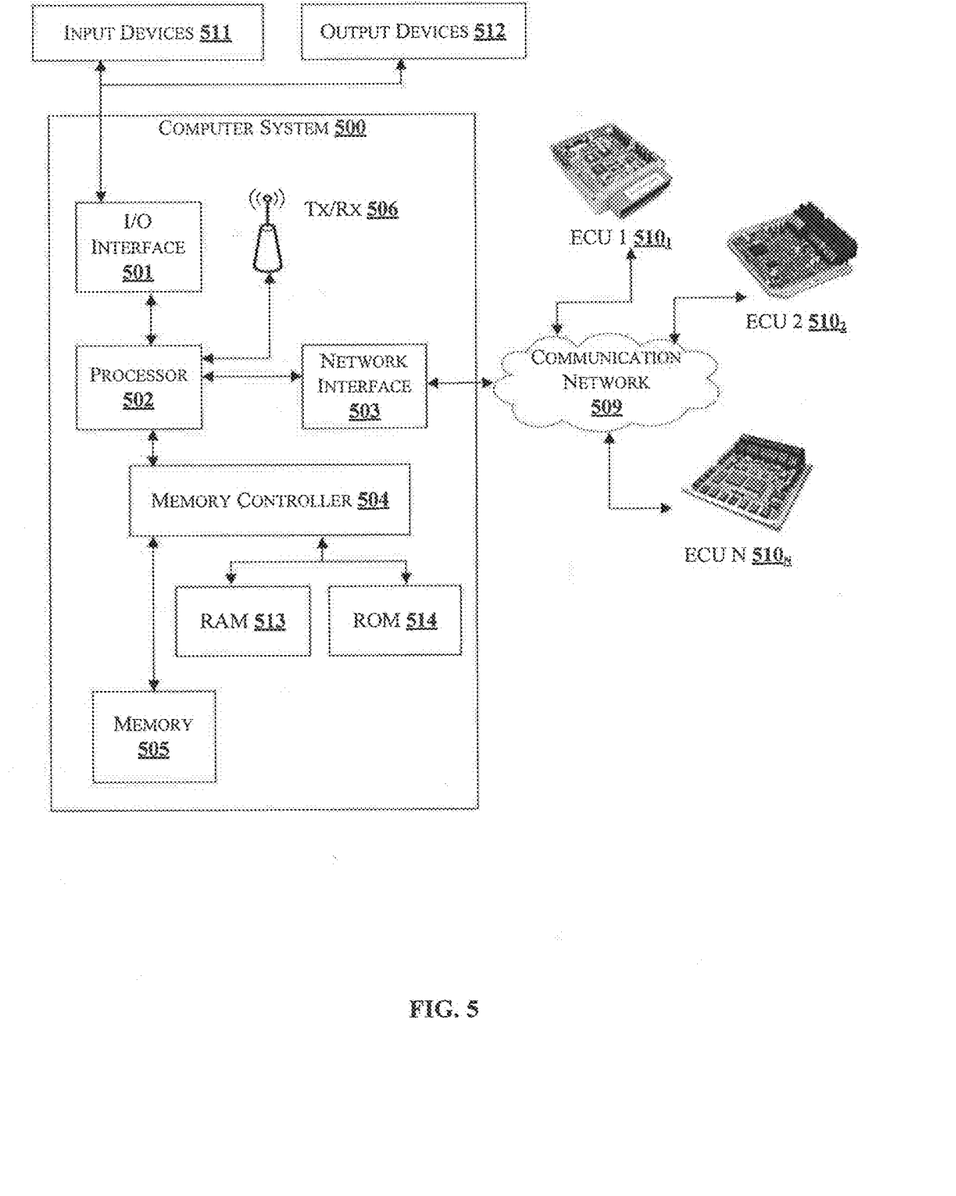
FIG. 5 illustrates a block diagram of an exemplary computer system for implementing embodiments consistent with the present disclosure.

FIG. 5 illustrates a block diagram of an exemplary computer system 500 for implementing embodiments consistent with the present invention. In an embodiment, the computer system 500 may be the electronic system 102 which is used for booting the automotive electronics 123 in the ECU 101 of the automobile. The computer system 500 may comprise a central processing unit ("CPU" or "processor") 502. The processor 502 may comprise at least one data processor for executing program components for executing user- or system-generated business processes. A user may include a person, a person using a device such as such as those included in this invention, or such a device itself. The processor 502 may include specialized processing units such as integrated system (bus) controllers, memory management control units, floating point units, graphics processing units, digital signal processing units, etc.

The processor 502 may be disposed in communication with one or more input/output (I/O) devices (511 and 512) via I/O interface 501. The I/O interface 501 may employ communication protocols/methods such as, without limitation, audio, analog, digital, stereo, IEEE-1394, serial bus, Universal Serial Bus (USB), infrared, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 501, the computer system 500 may communicate with one or more I/O devices (511 and 512).

In some embodiments, the processor 502 may be disposed in communication with a CAN communication network 509 via a network interface 503. The CAN network interface 503 may communicate with the communication network 509. The network interface 503 may employ connection protocols of the CAN. Using the network interface 503 and the communication network 509, the computer system 500 may communicate with one or more ECUs ECU 1 $510_1$ to ECU N $510_N$ on the bus.

In some embodiments, the processor 502 may be disposed in communication with a memory 505 (e.g., RAM, ROM, etc.) via a memory controller 504. The memory controller 504 may connect to memory 505 including, without limitation, NAND flash, NOR flash, eMMC, EEPROM etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory etc.

Advantages of the Embodiment of the Present Disclosure are Illustrated Herein.

In an embodiment, the present disclosure provides a method for faster booting of the automotive electronics in an Electronic Control Unit (ECU) of an automobile.

In an embodiment, the present disclosure provides a method for achieving a one-time initiation of the CAN Stack and related applications early in the booting before the operating system with its functional applications of the ECU of the automobile becomes active.

In an embodiment, the method of present disclosure reduces the delay and/or waiting time required for starting the operating system of the ECU during booting of the automotive electronics in the automobile.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Referral Numerals:

| Reference Number | Description |
| --- | --- |
| 100 | Environment |
| 101 | Electronic Control Unit (ECU) |
| 102 | Electronic system |
| 103 | I/O interface |
| 105 | Memory unit |
| 107 | Processor |
| 111 | Operating system |
| 112 | Applications of the ECU |
| 113 | Memory mapped region |
| 115 | OSEK OS |
| 117 | CAN stack |
| 119 | Data structure |
| 120 | Runtime interface for the OSEK based CAN stack |
| 121 | Runtime environment of the OSEK based CAN stack |
| 121a | OSEK Runtime environment of type 'A' |
| 121b | OSEK Runtime environment of type 'B' |
| 121c | OSEK Runtime environment of type 'C' |
| 122 | CAN bus |
| 123 | Automotive electronics |
| 125 | Interfacing function pointer table |
| 200 | Y-axis (denoting time of execution) |
| 202 | X-axis (denoting booting phases) |
| 201 | Booting phases |
| 201a | Boot loader phase |
| 201b | Pre-boot phase |
| 201c | Post-booting phase |
| 203 | Time of execution |
| 205 | Memory map |
| 205a | Boot Loader |
| 304 | Kernel loader |
| 306 | Kernel |

What is claimed is:

1. A method for booting automotive electronics in an Electronic Control Unit (ECU) of an automobile, the method comprising:
  implementing, by an electronic system, an Open Systems and their interfaces for the Electronics in motor vehicles (OSEK) based Controller Area Network (CAN) stack in each of a plurality of booting phases of the ECU, wherein the OSEK based CAN stack is stored in a memory mapped region of the ECU;
  creating, by the electronic system, a data structure that stores information pertaining to each of runtime information, state information, message buffers, and a diagnostic session state of the automobile, wherein the data structure is stored in the memory mapped region of the ECU; and
  executing, by the electronic system, one or more instructions of the OSEK based CAN stack for booting the automotive electronics in the ECU based on the information stored in the data structure, wherein the one or more instructions are executed across each of the booting phases of the ECU,
    wherein a runtime environment of the OSEK based CAN stack in each of the booting phases provides same set of system interfaces to each of the booting phases, and
    wherein the runtime environment of the OSEK based CAN stack is implemented separately at each of the booting phases for changes in functionalities of CAN stack at each of the booting phases.

2. The method as claimed in claim 1, wherein an OSEK OS is used for running the OSEK based CAN stack and one or more applications stored in the ECU.

3. The method as claimed in claim 2 further comprises updating an interfacing function pointer table of the OSEK based CAN stack upon completing execution of each of the booting phases based on the information stored in the data structure, wherein the interfacing function pointer table comprises one or more subroutine pointers required for performing one or more operations of the OSEK OS through each of the booting phases.

4. The method as claimed in claim 3, wherein the interfacing function pointer table is updated with one or more Application Program Interfaces (APIs) required for performing the one or more operations of the OSEK OS.

5. The method as claimed in claim 3, wherein the one or more instructions of the OSEK based CAN stack are executed as an application process of the OSEK OS in post booting phase.

6. The method as claimed in claim 1, wherein each of the booting phases comprises a boot loader phase, a pre-boot phase and the post booting phase.

7. The method as claimed in claim 1, wherein the data structure lives through each of the booting phases.

8. An electronic system for booting automotive electronics in an Electronic Control Unit (ECU) of an automobile, the electronic system comprising:
  a processor; and
  a memory unit communicatively coupled to the processor, wherein the memory unit stores processor-executable instructions, which, on execution, cause the processor to:
    implement an Open Systems and their interfaces for the Electronics in motor vehicles (OSEK) based Controller Area Network (CAN) stack in each of a plurality of booting phases of the ECU, wherein the OSEK based CAN stack is stored in a memory mapped region of the ECU;

create a data structure that stores information pertaining to each of runtime information, state information, message buffers, and a diagnostic session state of the automobile, wherein the data structure is stored in the memory mapped region of the ECU; and execute one or more instructions of the OSEK based CAN stack for booting the automotive electronics in the ECU based on the information stored in the data structure, wherein the one or more instructions are executed across each of the booting phases of the ECU, wherein a runtime environment of the OSEK based CAN stack in each of the booting phases provides same set of system interfaces to each of the booting phases, and wherein the instructions further cause the processor to separately implement the runtime environment of the OSEK based CAN stack at each of the booting phases for changes in functionalities of CAN stack at each of the booting phases.

9. The electronic system as claimed in claim 8, wherein the instructions cause the processor to run the OSEK based CAN stack and one or more applications stored in the ECU in an OSEK OS.

10. The electronic system as claimed in claim 9, wherein the instructions further cause the processor to update an interfacing function pointer table of the OSEK based CAN stack upon completion of execution of each of the booting phases based on the information stored in the data structure, wherein the interfacing function pointer table comprises one or more subroutine pointers required to perform one or more operations of the OSEK OS through each of the booting phases.

11. The electronic system as claimed in claim 10, wherein the instructions cause the processor to update the interfacing function pointer table with one or more Application Program Interfaces (APIs) required to perform the one or more operations of the OSEK OS.

12. The electronic system as claimed in claim 10, wherein the instructions cause the processor to execute the one or more instructions of the OSEK based CAN stack as an application process of the OSEK OS in the post booting phase.

13. The electronic system as claimed in claim 10, wherein each of the booting phases comprises a boot loader phase, a pre-boot phase and the post booting phase.

14. The electronic system as claimed in claim 10, wherein the data structure lives through each of the booting phases.

* * * * *